May 10, 1955    A. C. DIXON    2,708,226
IGNITION CIRCUIT BREAKER
Filed April 20, 1954    2 Sheets-Sheet 1
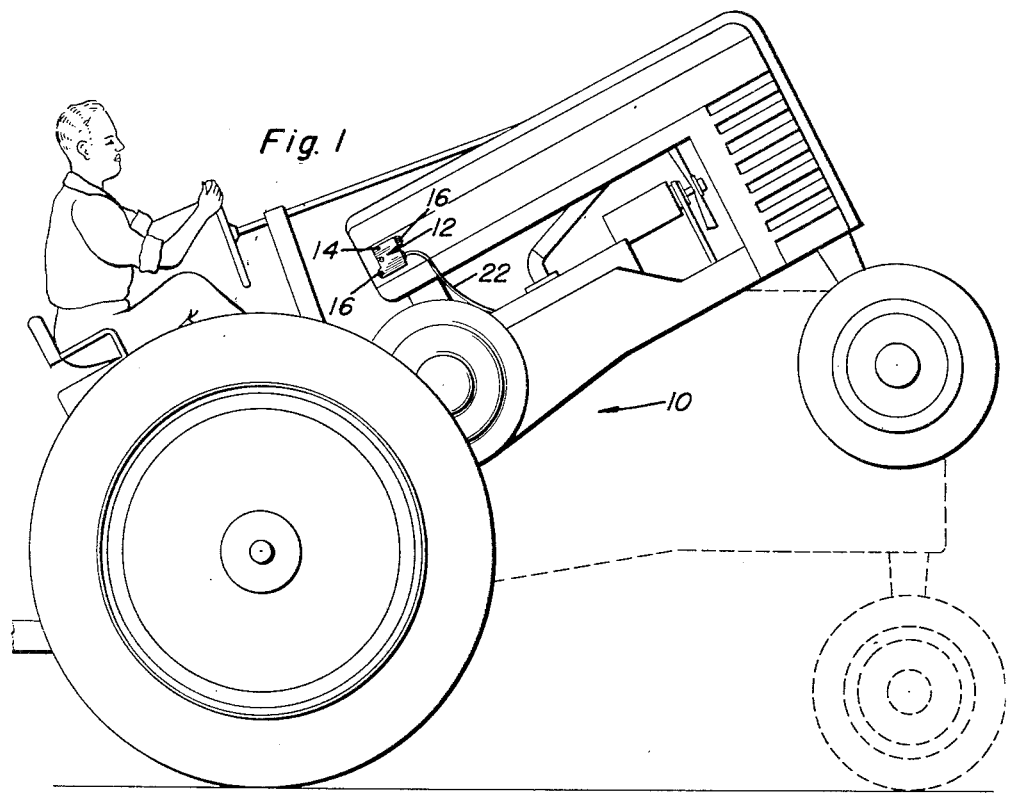
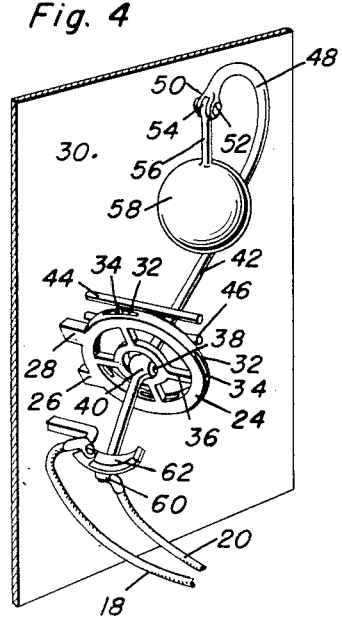
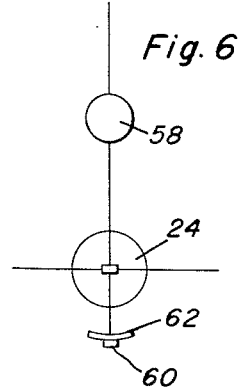
Adam C. Dixon
INVENTOR.
BY *Clarence A. O'Brien*
*and Harvey B. Jackson*
Attorneys May 10, 1955     A. C. DIXON     2,708,226
IGNITION CIRCUIT BREAKER
Filed April 20, 1954     2 Sheets-Sheet 2
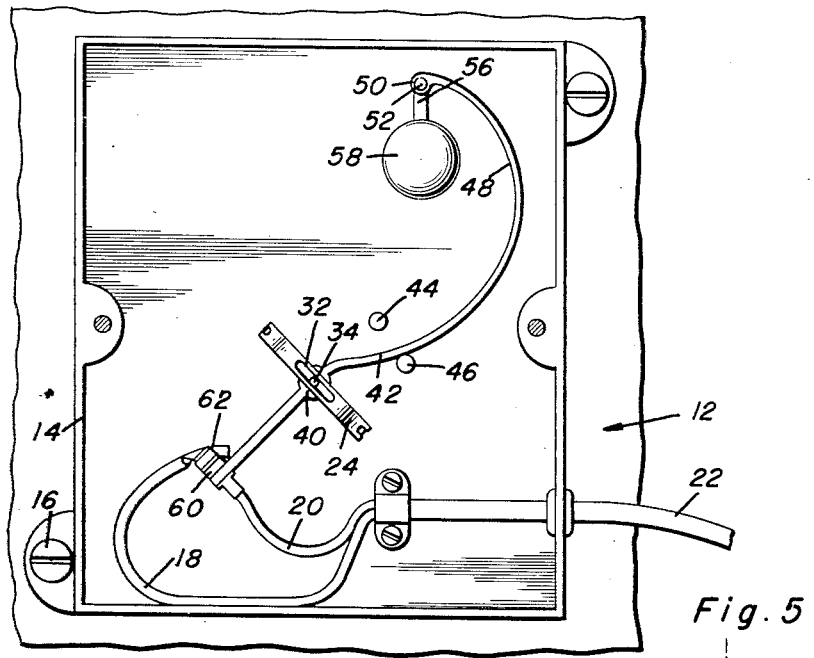
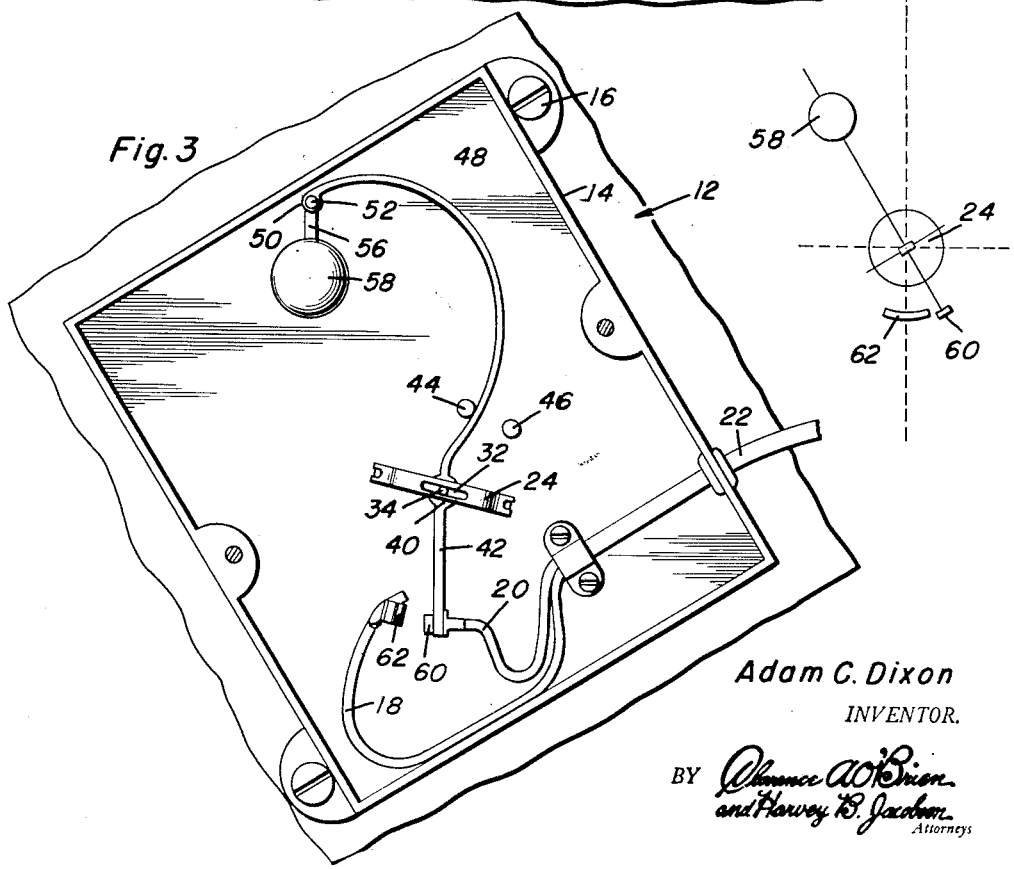
Adam C. Dixon
INVENTOR.

United States Patent Office 2,708,226
Patented May 10, 1955

2,708,226

IGNITION CIRCUIT BREAKER

Adam C. Dixon, Randolph, Vt.

Application April 20, 1954, Serial No. 424,406

7 Claims. (Cl. 200—61.52)

This invention relates to an attachment for a motor vehicle and more particularly to a device especially adapted for use on tractors and other similar vehicles for automatically preventing the operation of the vehicle when tilted to a dangerous degree, thereby assuring safe operation of the equipment.

Often when plowing or otherwise operating a tractor or like vehicle on hilly terrain, the vehicle becomes tilted at a dangerous angle, and further operation of the vehicle may result in the overturning of the vehicle thus endangering the operator of the vehicle while also subjecting the equipment to considerable damage. Incorporated in the present invention is means adapted to be associated with the tractor or like vehicle for automatically cutting the electrical distribution and the ignition system of the vehicle before the dangerous condition can be attained.

The construction of this invention especially features a pendulum weight pivotally attached to the hook end of a shaft which is rotatably mounted in a gimbal suspended outwardly from a mounting plate forming a portion of the casing of this ignition circuit breaker.

Another feature of the invention resides in the fact that the outer gimbal ring of the device is tilted at an angle relative to the horizontal and that the pivotal mounting of the pendulum weight is adapted to urge a fixed contact on the end of the shaft into resilient engagement with an arcuate fixed contact carried by the mounting plate.

Still further objects and features of this invention reside in the provision of an ignition circuit breaker that is strong and durable, simple in construction and manufacture, capable of being readily and easily installed on various existing makes and models of vehicles, and which is highly efficient in operation.

These, together with the various ancillary objects and features of the invention which will become apparent as the following description proceeds, are attained by this ignition circuit breaker, a preferred embodiment of which has been illustrated in the accompanying drawings, by way of example only, wherein:

Figure 1 is a perspective view illustrating the device as associated with a tractor vehicle;

Figure 2 is a side elevational view of the ignition circuit breaker shown with the cover of the casing removed therefrom and with the vehicle on which the device is mounted in a horizontal position;

Figure 3 is a view similar to that of Figure 2, but showing the device in a tilted position;

Figure 4 is a perspective view of the component parts of the ignition circuit breaker;

Figure 5 is a schematic diagram illustrating the relative arrangement of parts when the device is tilted sideways; and Figure 6 is another schematic diagram illustrating the device when the vehicle is in a horizontal position.

With continuing reference to the accompanying drawings wherein like reference numerals designate similar parts throughout the various views, reference numeral 10 generally designates a farm tractor or any other suitable vehicle on which the apparatus comprising the present invention and generally indicated by reference numeral 12 is adapted to be installed. This ignition circuit breaker 12 may include a casing 14 having a cover which may be removed therefrom for adjusting the working parts of the circuit breaker. The casing 12 may be secured by any suitable fasteners, such as screws 16 or the like to the vehicle 10, and suitable conductors as at 18 and 20 are utilized to connect the ignition circuit breaker to the electrical ignition and distribution system of the vehicle for controlling flow of electrical power from the generator and battery of the vehicle. The conductors 18 and 20 may be joined to form a suitable composite lead 22.

The ignition circuit breaker includes an outer gimbal ring 24 preferably having legs 26 and 28 integrally formed therewith, which legs 26 and 28 may be attached to the mounting plate 30 forming a part of the casing 14. The legs 26 and 28 hold the outer gimbal ring 24 in spaced relationship relative to the mounting plate 30. The outer gimbal ring 24 is provided with a series of slots 32 therein through which pins 34 attached to an inner gimbal ring 36 are seated. Thus, the inner gimbal ring 36 is rotatably mounted relative to the outer gimbal ring 24 for constrained rotation about a first axis of rotation. The inner gimbal ring 36 has attached thereto a pin 38 about which the hub 40 of a shaft 42 is pivotally mounted, the shaft 42 thus being mounted for constrained rotation about an axis of rotation normal to the axis of rotation of the inner gimbal ring 36 relative to the outer gimbal ring 24. A pair of stops 44 and 46 are attached to the mounting plate 30 and further hold and constrain the shaft 42 against further rotation.

The upper end of the shaft 42 is provided with a hook-like portion 48 which has a bifurcated end 50 through which a pin 52 extends, the pin 52 extending into an eye portion 54 of a stem 56 so as to provide a pivotal mounting for a pendulum weight 58 preferably of spherical shape. The lower end of the shaft 42 has a movable contact 60 affixed thereto to which the conductor 20 is attached. The fixed contact 60 is adapted to engage an elongated arcuate contact 62 secured to and extending outwardly from the mounting plate 30. The conductor 18 is attached to the contact 62.

An inspection of Figures 2 and 3 will readily reveal the action of the device should the device become tilted from the phantom lines shown in Figure 1 to the positioning of the machine as is shown in solid lines in Figure 1. Movement of the pendulum weight 58 which will always pivot to a vertically extending position due to the action of the stem 56 relative to the hook portion 48 will cause the entire shaft 42 to pivot about the pin 38, thereby moving the contact 60 from engagement with the contact 62 and thus cutting the ignition circuit. It is to be noted that the weight 58 may be so adjusted that the contact 60 will not become disengaged from the contact 62 until a given angle is reached.

With respect to the tilting of the vehicle 10 to one side or another, upon tilting of the vehicle, the pendulum 58 which will always seek to obtain a vertical position will cause rotation of the shaft 42 and of the inner gimbal ring 36 within the slots 32, thus causing the contact 60 to slide outwardly from engagement with the contact 62.

From the foregoing, the construction and operation of the device will be readily understood and further explanation is believed to be unnecessary. However, since numerous modifications and changes will readily occur to those skilled in the art, it is not desired to limit the invention to the exact construction shown and described, and accordingly, all suitable modifications and equivalents may be resorted to, falling within the scope of the appended claims.

What is claimed as new is as follows:

1. An ignition circuit breaking device for installation on a vehicle to prevent operation of a vehicle when the vehicle is tilted to a dangerous degree comprising a mounting plate, an outer gimbal ring spaced from and carried by said mounting plate, an inner gimbal ring carried by said outer gimbal ring for constrained rotation in a direction about a first axis of rotation, a shaft pivotally secured to said inner gimbal ring for constrained pivotal movement in a direction about a second axis of rotation normal to said first axis of rotation, a fixed contact carried by said mounting plate, a movable contact carried by said shaft engageable with said fixed contact, said shaft having an upper hook-like end, and a pendulum weight pivotally attached to and depending from said upper hook-like end, said pendulum weight being pivotally mounted for rotation in a direction about a third axis of rotation parallel to said second axis of rotation.

2. An ignition circuit breaking device for installation on a vehicle to prevent operation of a vehicle when the device is tilted to a dangerous degree comprising a mounting plate, an outer gimbal ring spaced from and carried by said mounting plate, an inner gimbal ring carried by said outer gimbal ring for constrained rotation in a direction about a first axis of rotation, a shaft pivotally secured to said inner gimbal ring for constrained pivotal movement in a direction about a second axis of rotation normal to said first axis of rotation, a fixed contact carried by said mounting plate, a movable contact carried by said shaft engageable with said fixed contact, said shaft having an upper hook-like end, and a pendulum weight pivotally attached to and depending from said upper hook-like end, said pendulum weight being pivotally mounted for rotation in a direction about a third axis of rotation parallel to said second axis of rotation, said first contact being arcuate in configuration.

3. An ignition circuit breaking device for installation on a vehicle to prevent operation of a vehicle when the vehicle is tilted to a dangerous degree comprising a mounting plate, an outer gimbal ring spaced from and carried by said mounting plate, an inner gimbal ring carried by said outer gimbal ring for constrained rotation in a direction about a first axs of rotation, a shaft pivotally secured to said inner gimbal ring for constrained pivotal movement in a direction about a second axis of rotation normal to said first axis of rotation, a fixed contact carried by said mounting plate, a movable contact carried by said shaft engageable with said fixed contact, said shaft having an upper hook-like end, and a pendulum weight pivotally attached to and depending from said upper hook-like end, said pendulum weight being pivotally mounted for rotation in a direction about a third axis of rotation parallel to said second axis of rotation, said outer gimbal ring having a pair of legs extending outwardly therefrom, said legs being attached to said mounting plate, said outer gimbal ring having a series of slots therein, said inner gimbal ring having pins attached thereto movable within said slots.

4. An ignition circuit breaking device for installation on a vehicle to prevent operation of a vehicle when the vehicle is tilted to a dangerous degree comprising a mounting plate, an outer gimbal ring spaced from and carried by said mounting plate, an inner gimbal ring carried by said outer gimbal ring for constrained rotation in a direction about a first axis of rotation, a shaft pivotally secured to said inner gimbal ring for constrained pivotal movement in a direction about a second axis of rotation normal to said first axis of rotation, a fixed contact carried by said mounting plate, a movable contact carried by said shaft engageable with said fixed contact, said shaft having an upper hook-like end, and a pendulum weight pivotally attached to and depending from said upper hook-like end, said pendulum weight being pivotally mounted for rotation in a direction about a third axis of rotation parallel to said second axis of rotation, said outer gimbal ring being arranged at an acute angle to the horizontal when the vehicle is in a horizontal position.

5. An ignition circuit breaking device for installation on a vehicle to prevent operation of a vehicle when the vehicle is tilted to a dangerous degree comprising a mounting plate, an outer gimbal ring spaced from and carried by said mounting plate, an inner gimbal ring carried by said outer gimbal ring for constrained rotation in a direction about a first axis of rotation, a shaft pivotally secured to said inner gimbal ring for constrained pivotal movement in a direction about a second axis of rotation normal to said first axis of rotation, a fixed contact carried by said mounting plate, a movable contact carried by said shaft engageable with said fixed contact, said shaft having an upper hook-like end, and a pendulum weight pivotally attached to and depending from said upper hook-like end, said pendulum weight being pivotally mounted for rotation in a direction about a third axis of rotation parallel to said second axis of rotation, said first contact being arcuate in configuration, said outer gimbal ring having a pair of legs extending outwardly therefrom, said legs being attached to said mounting plate, said outer gimbal ring having a series of slots therein, said inner gimbal ring having pins attached thereto movable within said slots.

6. An ignition circuit breaking device for installation on a vehicle to prevent operation of a vehicle when the vehicle is tilted to a dangerous degree comprising a mounting plate, an outer gimbal ring spaced from and carried by said mounting plate, an inner gimbal ring carried by said outer gimbal ring for constrained rotation in a direction about a first axis of rotation, a shaft pivotally secured to said inner gimbal ring for constrained pivotal movement in a direction about a second axis of rotation normal to said first axis of rotation, a fixed contact carried by said mounting plate, a movable contact carried by said shaft engageable with said fixed contact, said shaft having an upper hook-like end, and a pendulum weight pivotally attached to and depending from said upper hook-like end, said pendulum weight being pivotally mounted for rotation in a direction about a third axis of rotation parallel to said second axis of rotation, said first contact being arcuate in configuration, said outer gimbal ring being arranged at an acute angle to the horizontal when the vehicle is in a horizontal position.

7. An ignition circuit breaking device for installation on a vehicle to prevent operation of a vehicle when the vehicle is tilted to a dangerous degree comprising a mounting plate, an outer gimbal ring spaced from and carried by said mounting plate, an inner gimbal ring carried by said outer gimbal ring for constrained rotation in a direction about a first axis of rotation, a shaft pivotally secured to said inner gimbal ring for constrained pivotal movement in a direction about a second axis of rotation normal to said first axis of rotation, a fixed contact carried by said mounting plate, a movable contact carried by said shaft engageable with said fixed contact, said shaft having an upper hook-like end, and a pendulum weight pivotally attached to and depending from said upper hook-like end, said pendulum weight being pivotally mounted for rotation in a direction about a third axis of rotation parallel to said second axis of rotation, said first contact being arcuate in configuration, said outer gimbal ring having a pair of legs extending outwardly therefrom, said legs being attached to said mounting plate, said outer gimbal ring having a series of slots therein, said inner gimbal ring having pins attached thereto movable within said slots, said outer gimbal ring being arranged at an acute angle to the horizontal when the vehicle is in a horizontal position.

References Cited in the file of this patent
UNITED STATES PATENTS

| 1,237,734 | Wood | Aug. 21, 1917 |
| 2,170,584 | Ayers | Aug. 22, 1939 |